Oct. 11, 1960   J. H. CHOUINARD   2,955,835
STAND-UP SULKY

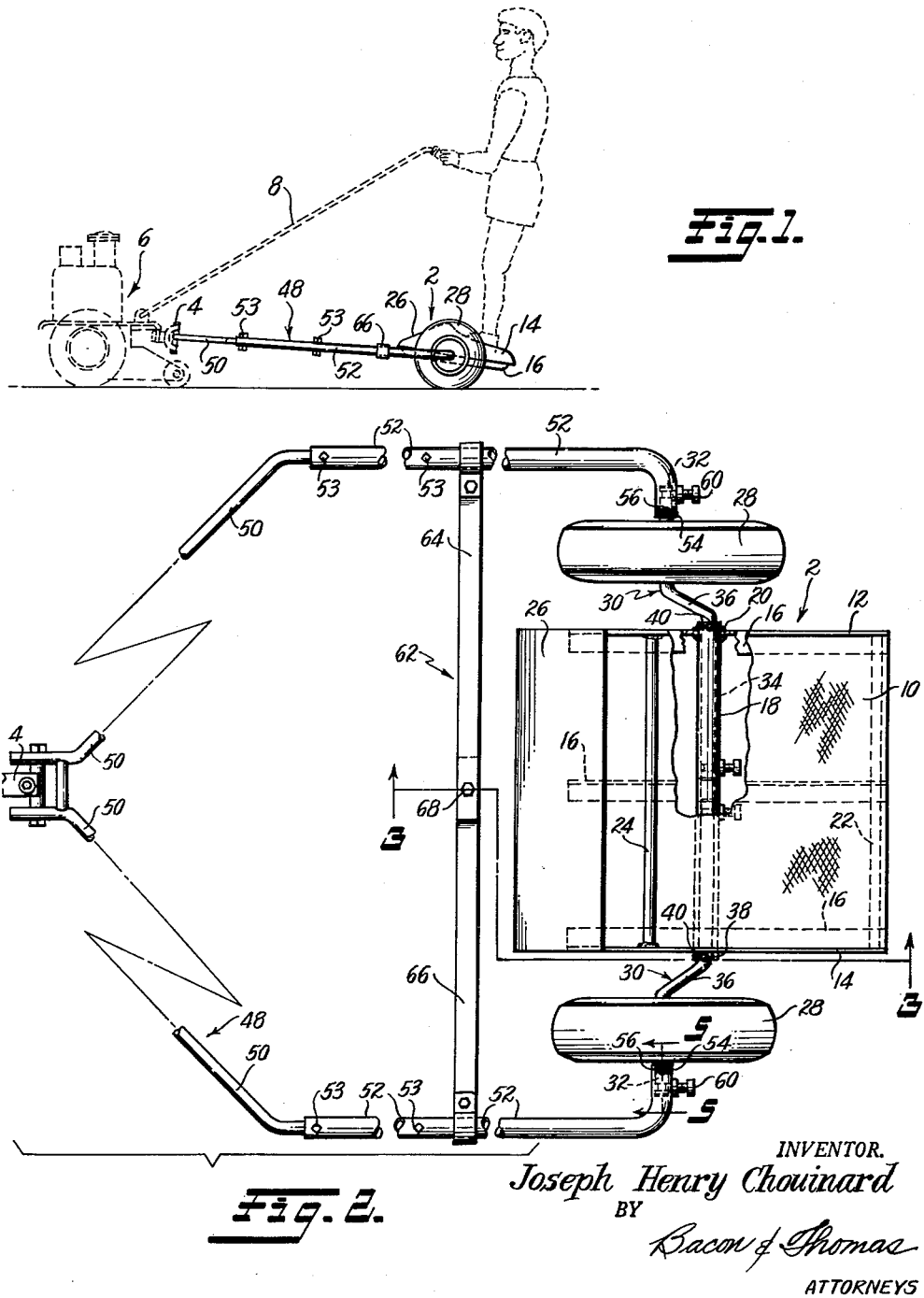

Filed June 2, 1959   2 Sheets-Sheet 2

INVENTOR.
Joseph Henry Chouinard
BY
Bacon & Thomas
ATTORNEYS

United States Patent Office 2,955,835
Patented Oct. 11, 1960

2,955,835

STAND-UP SULKY

Joseph Henry Chouinard, 34 Broad St., East Hartford, Conn.

Filed June 2, 1959, Ser. No. 817,521

10 Claims. (Cl. 280—43)

This invention relates to a stand-up sulky for use with a powered towing implement whereby an operator may stand on the sulky to ride along behind and control the implement.

In general the device comprises a wheeled platform having a tongue or yoke member provided with means for pivotally connecting the same to a towing implement, such as a power lawn mower or the like. The tongue or yoke member is adjustable as to length so that the distance of the sulky from the implement may be regulated to place the operator at the proper distance behind the implement to comfortably and easily manipulate the usual rearwardly extending controls provided on such implements. In a preferred form the invention comprises a platform having a pair of ground wheels which are independently adjustable in a vertical direction relative to the platform and where the tilt of the platform may also be adjusted, all to accommodate to different types of terrain and to suit the desires of the individual user.

It is therefore an object of this invention to provide a stand-up sulky having a platform adjustable as to height and/or tilt.

Another object of the invention is to provide a stand-up sulky having a platform upon which the operator stands and which platform is provided with a protective shield.

Still another object of the invention is to provide a stand-up sulky of the type set forth which is simple and economical in construction yet rigid and reliable in operation.

An additional object of the invention is to provide a stand-up sulky having adjustable means whereby its distance from a towing implement may be regulated to place the rider in the most convenient position for manipulation of implement controls.

Still other objects and advantages will become apparent to those skilled in the art as the description proceeds with reference to the accompanying drawings, wherein:

Fig. 1 is a somewhat schematic side view of the present invention attached to a towing implement;

Fig. 2 is a top plan view, with parts broken away, of a preferred embodiment of the invention;

Figure 3:
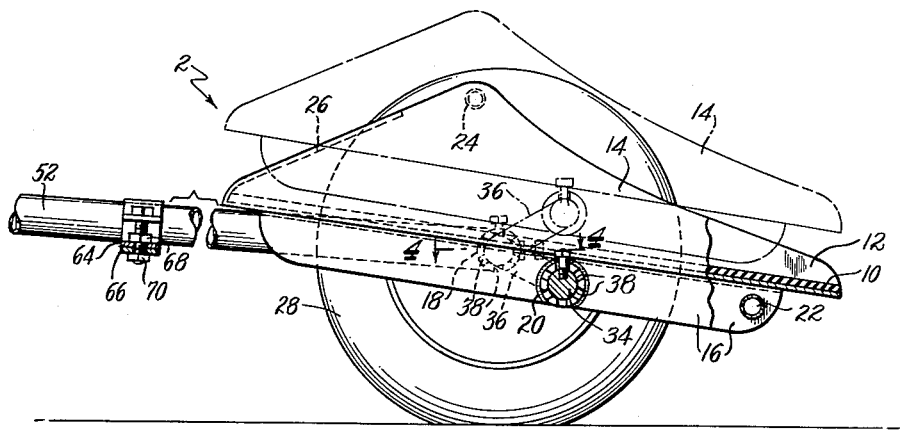
Fig. 3 is a fragmentary vertical sectional view, on an enlarged scale, taken substantially along the line 3—3 of Fig. 2.

The stand-up sulky of the present invention is indicated generally by reference numeral 2 in Fig. 1 and is shown attached, through a suitable universal joint 4 and tongue member 48, to a towing implement 6, in this case represented as a power lawn mower. The power mower illustrated is provided with the usual rearwardly and upwardly extending handle 8 having manual controls (not shown) thereon for controlling operation of the mower.

The sulky 2 comprises a platform 10 (Figs. 2 and 3) having side flanges 12 and 14 thereon. The platform is further provided with reinforcing angle iron members 16 fixed to its lower surface at the lateral edges thereof by any suitable means such as welding or the like. A transverse tube 18 extends through openings in the angle iron members 16 and is welded thereto, as at 20, whereby the tube 18 is held rigidly to the platform 10 with its ends projecting past the sides of the platform. If desired, suitable cross braces 22 and 24 may be provided between the flanges 12 and 14. At their forward edges the flanges 12 and 14 are formed to extend upwardly and rearwardly and a transverse, substantially imperforate shield 26 is fixed to those edges to constitute a moisture and grass shield for the feet of an operator. As will be obvious, the shield 26 at least partially overlies the feet of a rider on the sulky and serves to deflect moisture, grass or the like which may be projected rearwardly by the mower 6.

Figure 4:
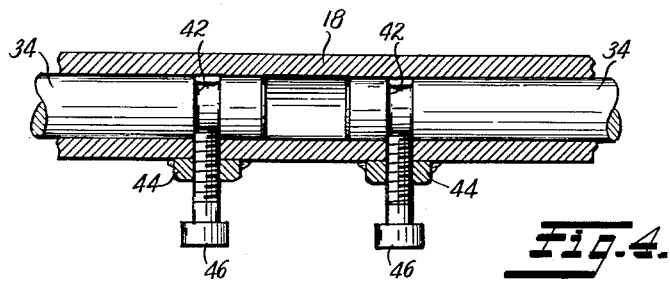
Fig. 4 is an enlarged fragmentary sectional view taken substantially along the line 4—4 of Fig. 3.

A pair of ground wheels 28 are provided for supporting the sulky. The ground wheels 28 and their related axle structures, to be described, are identical in construction except that one is the reverse of the other. Each wheel 28 is provided with an axle structure 30 having an extending portion 32 projecting outwardly of the wheel and a radially offset portion 34 defining an axis radially offset from the axis of the wheel 28. The portions 30 and 34 are connected by a crank portion 36. The offset portion 34 of each axle extends into the adjacent end of the tube 18 as shown. At its outer ends the tube 18 is provided with a plurality of radial notches 38 (see Fig. 3) and the offset portion 34 of each axle is provided with a pin structure 40 adapted to be received in a selected notch 38. The pins 40 are rigidly secured to the axle structures and, when engaged in a notch 38, hold the offset axle portion 34 against rotation in the tube 18. The innermost ends of the offset portions 34 are provided with circumferential grooves 42 and the tube 18 has nuts or the like 44 affixed thereto. Suitable screws 46 are threaded through openings in the side wall of the tube 18 into the circumferential grooves 42. Thus when the screws 46 are in the position shown in Fig. 4, the offset portions 34 are held against axial movement in the tube 18. The parts are so dimensioned and related that the circumferential grooves 42 and screws 46 are in the described relationship when pins 40 are seated in selected notches 38. It will be obvious from the above that the screws 46, or either of them, may be withdrawn partially to permit axial withdrawal of the offset portions 34 from tube 18 sufficiently to disengage pins 40 from notches 38, whereupon the offset portion 34 may be rotated through the desired angle and pin 40 re-engaged in a different notch 38. Upon then tightening the screw 46 an adjustment has been effected wherein the vertical relationship of the platform and wheel have been changed. Thus, the wheels may be either raised or lowered relative to the platform 10 in the manner described, to adjust the fore-and-aft tilt of the platform and at the same time regulate its height above the ground.

To enable the height of the platform to be adjusted in the manner described, it is also necessary that an adjustment be provided at the outer ends 32 of the axle structures 30.

A tongue or drawbar member is provided in the form of a yoke 48 (Figs. 1 and 2) and is of generally U-shape with its midportion defining means for connection to the universal joint 4 and its opposite legs extending rearwardly outwardly of the wheels 28. The forward portion of the yoke 48 comprises solid rod elements 50 extending rearwardly in telescoping relation to the forward end portions of tubular leg elements 52. By means of suitable screws, through-pins, or the like 53, the extent of projection of rods 50 into tubular legs 52 may be adjusted and/or regulated. Thus the length of the yoke may be adjusted to position the platform 10 at the desired distance rearwardly of the implement 6 so that the user may ride on the platform in a position to conveniently and comfortably reach and manipulate the controls on handle 8.

Figure 5:
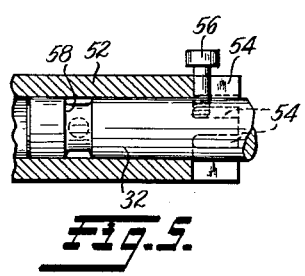
Fig. 5 is an enlarged fragmentary sectional view taken substantially along the line 5—5 of Fig. 2.

At their rearmost ends the tubular elements 52 are turned inwardly into alignment with the outer end portions 32 of the axle structures 30. Those outer end portions extend telescopically into the ends of the tubular leg portions 52 as shown. The inner ends of the leg portions 52 are each provided with a circumferential series of radial notches 54 (see also Fig. 5). The projecting portions 32 of the axles 30 are provided with pins or the like 56 extending radially therefrom and receivable in a selected notch 54. As shown, the pins 56 comprise bolts threaded into axle portions 32 with unthreaded shanks engageable in notches 54. The portions 32 are also provided with circumferential grooves 58 for the reception of the inner ends of locking screws 60. As will be obvious, the angular relation of the legs 52 to the axles 30 may be adjusted in the same manner as described in connection with the angular adjustment of offset portions 34 in tube 18. Thus, to effect a change in the fore-and-aft tilt of the platform 10 it is only necessary to effect the previously described adjustment of offset portions 34 in tube 18. That adjustment effects a change in the tilt of the platform without changing the height of the offset portions 34 relative to the ground. However, by adjusting the angular relation of leg portions 52 to the axle structures 30, the height of the offset portions 34 above the ground is changed and the height of the platform is therefore changed. As will be obvious, the height of one side of the platform 10 relative to only one of the wheels may be changed, if desired, for use on side hill locations. In such event, however, the height adjustment at only one side of the platform results in a lateral skewing of the platform. Under such circumstances the rod 50 on one side of the yoke 48 may be adjusted into or out of its corresponding tubular leg portion 52 to compensate for the skewing produced by the described adjustment and the sulky will then be adjusted for side hill use.

To further assist in holding the inwardly turned ends of tubular leg portions 52 in the desired relation to the projecting ends 32 of axles 30, a tie strap structure 62 is provided. The tie strap structure comprises two elongated tension members or straps 64 and 66, secured respectively to their associated leg portions 52 in any desired manner but closely adjacent the forward edge of the platform 10. The inner ends of the straps 64 and 66 overlap and are provided with aligned openings (not identified) adapted to receive a bolt 68 with cooperating nut 70. Thus, when it is desired to adjust the wheels or platform in the manners previously described, the bolt 68 may be removed to release the tie member 62 and locking bolts 60 removed to permit leg portions 52 to be sprung outwardly, thereafter the described adjustments of the axle structures relative to either legs 52 or platform 10 may be made.

While a single specific embodiment of the invention has been shown and described herein, it is to be understood that other embodiments may be resorted to within the scope of the appended claims.

I claim:

1. A stand-up sulky for a towing implement, comprising; a tongue member having means thereon for pivotal attachment to a towing implement, at least one ground wheel and axle means therefor, means securing said tongue member to said axle means, a platform and means mounting the same on said axle means for pivotal movement thereon about an axis laterally offset from the center of said wheel, means for selectively adjusting the height of said platform mounting means relative to said wheel and for locking said platform in a selected position of pivotal adjustment about said offset axis.

2. A stand-up sulky for a towing implement, comprising; a tongue member having means thereon for pivotal attachment to a towing implement, at least one ground wheel and axle means therefor, means securing said tongue member to said axle means, a platform and means mounting the same on said axle means for pivotal movement thereon about an axis laterally offset from the center of said wheel, means for selectively adjusting said platform angularly about said offset axis, and means for selectively adjusting the vertical position of said platform mounting means.

3. A sulky as defined in claim 2 wherein said last-named means comprises means for rotatably adjusting said axle means relative to said tongue member whereby to swing said platform mounting means about the axis of said wheel.

4. A sulky as defined in claim 2 having two ground wheels and axle means, said platform and its mounting means being between said wheels, there being means for independently adjusting the height of said platform mounting means relative to each of said wheels.

5. A sulky as defined in claim 4 wherein said tongue member is provided with spaced portions secured respectively to said separate axle means.

6. A stand-up sulky for a towing implement, comprising; a tongue member having means thereon for pivotal attachment to a towing implement, at least one ground wheel and axle means therefor, means securing said tongue member to said axle means, a platform and means mounting the same on said axle means for pivotal movement thereon about an axis laterally offset from the center of said wall, means for selectively adjusting the height of said platform mounting means relative to said wheel and for locking said platform in a selected position of pivotal adjustment about said offset axis, and an upwardly and rearwardly directed guard member of substantially imperforate sheet material secured to the forward portion of said platform and arranged to at least partially overlie the feet of a person standing on said platform.

7. A stand-up sulky for a towing implement, comprising; a pair of axially spaced ground wheels, an axle for each wheel, the inner end portions of said axles being radially offset, a platform mounted on said offset portions for selective angular adjustment therearound, means for locking said platform in selected positions of angular adjustment, a generally U-shaped yoke having means at the mid-portion thereof for swivelly attaching the same to a towing implement, the ends of said yoke being respectively secured to the outer ends of said axles in substantial alignment with the centers of said wheels and for selective angular adjustment about the axes thereof and means for locking the ends of said yoke to said axles in selected positions of angular adjustment.

8. A sulky as defined in claim 7 including releasable tie means extending between the sides of said yoke adjacent said platform for holding said ends of said yoke against separation.

9. A sulky as defined in claim 7 wherein said platform is provided with an open-ended tube fixed thereto in alignment with said offset portions, the ends of said tube having angularly spaced radial notches therein, said offset portions extending slidably and rotatably into the ends of said tube and each having a radial pin thereon engaging a selected one of said notches, and selectively releasable means holding said offset portions against movement outwardly of said tube.

10. A sulky as defined in claim 7 wherein the said ends of said yoke comprise tubular portions axially aligned with the outer ends of said axles, said tubular portions having angularly spaced radial notches in the ends thereof, the outer ends of said axles extending slidably and rotatably into said tubular portions and each having a radial pin thereon engaging a selected one of said notches, and selectively releasable means holding said axles against movement outwardly of the ends of said tubular portions.

References Cited in the file of this patent

UNITED STATES PATENTS

| | | |
|---|---|---|
| 211,786 | Remy | Jan. 28, 1879 |
| 719,059 | Tabor | Jan. 27, 1903 |
| 2,657,408 | Machovec | Nov. 3, 1953 |
| 2,670,217 | Hruza | Feb. 23, 1954 |

FOREIGN PATENTS

| | | |
|---|---|---|
| 167,915 | Australia | Jan. 13, 1954 |